Oct. 19, 1954 A. EILERTSEN ET AL 2,692,304
COORDINATE SELECTOR WITH EACH OTHER CROSSING BARS
Filed June 11, 1952 2 Sheets-Sheet 1

INVENTORS
AAGE EILERTSEN
RUDOLF WALDEMAR INGRE
ANDERS OSSIAN JÖRGENSEN
JOEL EDVIN WIKSTRÖM
BY Fredrik E. Hane
ATTORNEY Oct. 19, 1954 A. EILERTSEN ET AL 2,692,304

COORDINATE SELECTOR WITH EACH OTHER CROSSING BARS

Filed June 11, 1952 2 Sheets-Sheet 2

INVENTORS
AAGE EILERTSEN
RUDOLF WALDEMAR INGRE
ANDERS OSSIAN JÖRGENSEN
JOEL EDVIN WIKSTRÖM

BY Frederick E. Hane
ATTORNEY

Patented Oct. 19, 1954 2,692,304

UNITED STATES PATENT OFFICE

2,692,304

COORDINATE SELECTOR WITH EACH OTHER CROSSING BARS

Aage Eilertsen, Hagersten, Rudolf Waldemar Ingre, Stockholm, Anders Ossian Jörgensen, Traneberg, and Joel Edvin Wikström, Stockholm, Sweden, assignors to Telefonaktiebolaget L M Ericsson, Stockholm, Sweden, a company of Sweden Application June 11, 1952, Serial No. 293,008

Claims priority, application Sweden June 18, 1951

6 Claims. (Cl. 179—27.54)

The present invention relates to a coordinate selector with each other crossing bars, which may be brought into contact with each other at the crossing points. The invention refers further to such coordinate selectors where the vertical leads form groups, which are situated in different, to each other parallel planes, and the horizontal leads form groups, which are also arranged in different, to each other parallel planes. With such coordinate selectors it is usual to mount all the leads in a frame, whereby the vertical leads are fixed to the horizontal sides of the frame and the horizontal leads are fixed between the vertical sides of the frame. Such a selector has only a limited capacity and it is difficult to clean and to control the contact points within such a multiple.

According to the present invention these mentioned disadvantages are avoided by means of arranging the leads for each one of the horizontal and for each one of the vertical planes in a frame, in which at least one group of leads is fastened, and by means of providing for each crossover point a carrier (driver), which is movably mounted in the mentioned frame.

The invention shall now be particularly described with the help of the attached Figures 1–4.

Figure 1:
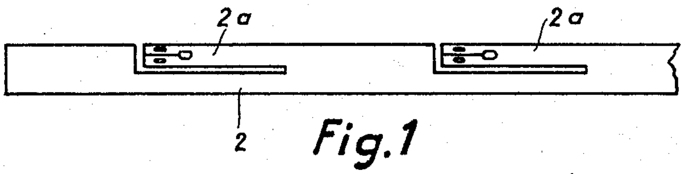
Figure 2:
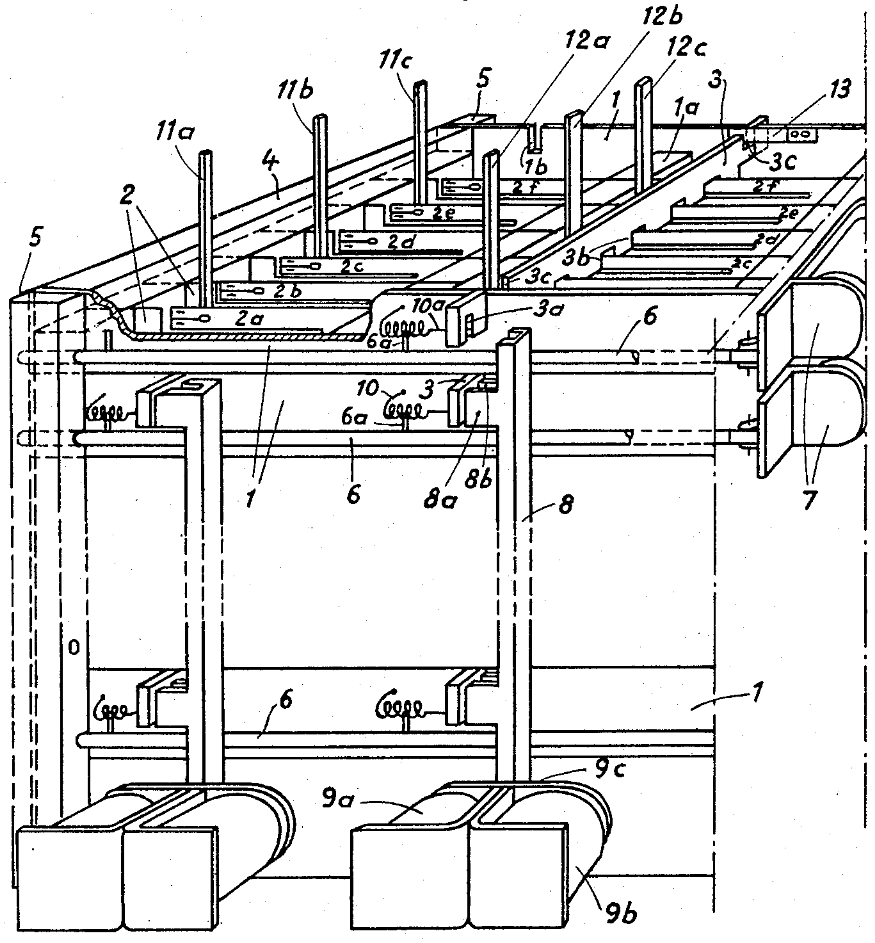
Figure 3:
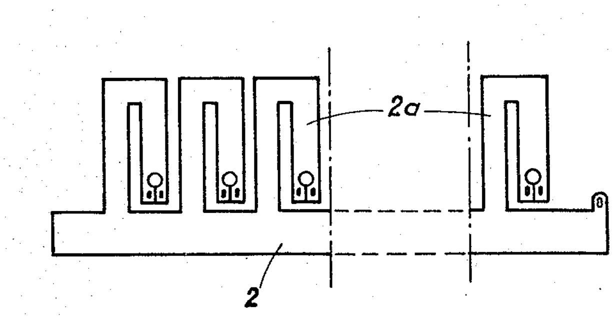
Figure 4:
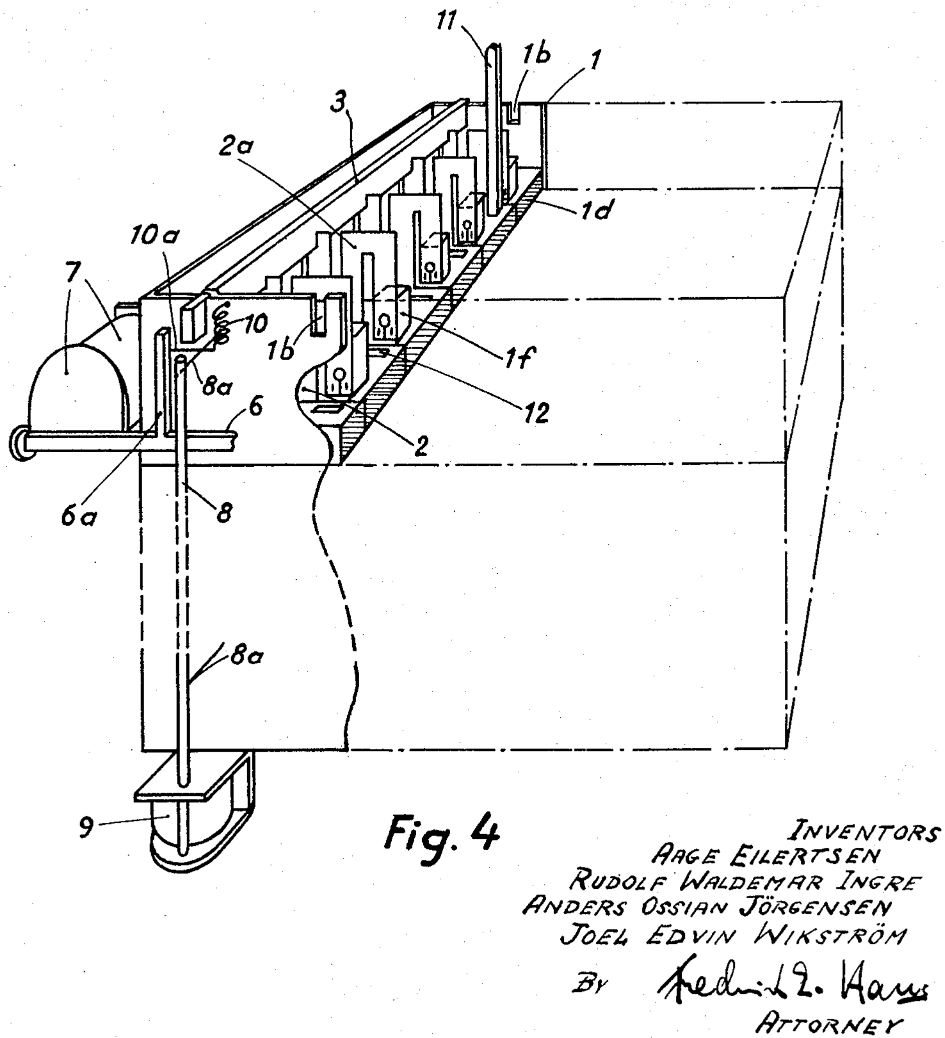

Figs. 1 and 3 show different constructions of resilient leads arranged horizontally in Fig. 2 and Fig. 4, respectively.

Fig. 2 shows the construction of a coordinate selector according to the invention where each vertical lead may be brought into contact with either one of two horizontal leads in each crossover point and where the horizontal bars 6 operate an indicator organ 10 whilst the vertical bars 8 operate the carrier (driver) 3 for closing the contact in the crossover point.

Fig. 4 shows another construction of a coordinate selector according to the invention, where the horizontal leads are provided with upright tongues according to Fig. 3 and the vertical bars 8 operate the indicator member 10 whilst the horizontal bars 6 operate the carrier (driver) 3 for closing the contacts in a crossover point. For Fig. 1 and Fig. 3 no particular description is necessary. Only the resilient tongues of the bars are constructed in different manners in such a way that the clearance which is necessary in each crossover point for coupling of the crossing leads has a different form. In Fig. 2 the magnets 7 need less room than in Fig. 4 because in Fig. 2 they serve only for indicating and receive only short current pulses, whilst in Fig. 4 they are used for closing multiple contacts and should be suitable to be closed permanently.

In Fig. 2, 1 is a frame with a bolt (latch) for every vertical group of leads 11 and 12, respectively. The latches 1*a* are provided with a groove, in which the horizontal bars 2 rest. By means of a lock bolt 4 at each short side of the frame, the bars 2 are fastened in their grooves. The frame is further on provided with a base or clamp with a hole for holding and controlling the vertical leads 11 and 12, respectively. A corresponding base is shown in Fig. 4 indicated by 1*d*.

At each long side of the frame 1 there is provided for each group of vertical leads 11—12 a groove 1*b* for the carrier (driver) 3, which is fastened by means of two leaf springs 13, one at each long side, on the inside of the frame 1. The springs 13 engage an elongated groove of the carrier (driver) 3 in such a manner, that the driver can be shifted in its horizontal direction either way. The carrier 3 is further provided with a notch 3*b* for each lead 2 and a notch 3*a* for an indicator member consisting of a helical spring 10.

A multitude of frames 1 are stacked one upon the other and kept together by means of four vertical supports 5. There is provided for each frame a bar 6, which engages at least one of the supports 5 and which may be shifted in its horizontal direction by respective electromagnet 7. Each bar 6 has a peg 6*a* at each carrier 3 of each frame. There is further on a helical spring 10 for each carrier. The one end of the helical spring 10 is fastened to the frame 1 and its other end is provided with, or shaped as, a peg 10*a*.

There is for each vertical group of bars 11 or 12 a bar 8, which may be, by means of two electromagnets 9*a* and 9*b*, pivoted in the one or the other direction. A bar 8, which has a U-shaped cross-section, is provided for each frame 1 and each bar has two laterally extending arms 8*a* and 8*b*.

When one of the magnets 7 attracts its armature, the respective bar 6 is drawn to the right and its peg 6*a* stretches the respective helical spring 10 in such a manner, that the peg 10*a* which rests in the groove 3*a*, is pulled between the arms 8*a* and 8*b* of the bar 8. When the bar 8 is then turned, the carrier 3 of the peg 10*a* is shifted in its horizontal direction.

When the carrier 3 is moved ahead by the magnet 9*a*, the spring 13 at the far side of frame is tensioned whilst the corresponding spring at the near side of the frame slides in the respective notch 3*c* in the carrier 3. The tongues 2*b*, 2*d* and 2*f* are bent against the bars 12*a*, 12*b* and 12*c* respectively, whilst the tongues 2*a*, 2*c* and 2*e* slide in their recesses 3*b* without being operated.

When the carrier 3 is moved back by the magnet 9*b*, the tongues 2*a*, 2*c* and 2*e* are operated, whilst the tongues 2b, 2d, and 2f run into their recesses 3b without being operated.

When the energized magnet 7 releases its armature, the bar 6 is drawn back by a spring, which is not shown in the figure. The peg 10a is now clamped between one of the arms 8a—8b and the carrier 3 at the right hand side of the spring 10 is under tension by the peg 6a. When later on also the magnet 9a (or 9b) releases, the spring 10 is released as the respective carrier 3 returns to its rest position and the peg 10a is drawn out of the space between the arms 8a and 8b.

When the magnets 9a—9b keep their armatures attracted, whilst the one of the magnets 7 draws its bar 6 to the right, the helical spring 10 will be compressed in the crossover point between the bars, because one of the arms 8a—8b closes now the outlet of the groove 3a for the peg 10a.

Fig. 4 shows another form of the invention. In this case, the vertical bars 8 operate the indicator member 10 whilst the horizontal bars 6 are provided with an arm 6a at each crossover point. There is only one magnet 7 for each bar, therefore the carrier 3 can only be moved backwards. The coordinate selector has five terminals. As the necessary space shall be small, the tongues 2a at the horizontal leads 2 are formed by two parallel parts according to Fig. 3, of which the right hand part is a contact spring, whilst the left hand one is used as terminal lug for connection with the current supply.

The frame 1 has a base 1d with a hole 12 therethrough for the vertical leads 11, of which only one is shown in the figure. The base 1d further supports upright bars 11 against which the right hand part of the tongues rests. There is in the right hand side of the frame 1 the groove 1b for controlling the carrier 3, which again is provided with grooves for each tongue 2a.

When the magnet 9 attracts its armature, the bar 8 with the peg 8a is lifted. Each peg 8a operates a helical spring 10, the upper part of which is compressed whilst the lower part, which is extended to form a peg 10a, is lifted. The peg 10a is lifted over the lower edge of the carrier 3. When now one bridge magnet 7 attracts its armature, the bar 6 is turned and the arm 6a presses the peg 10a against the nearer end of the carrier 3. The carrier 3 is pressed back and bends the tongues 2a back, whereby the right hand part of each tongue acts as a two armed lever for which the upper edge of its support 1f forms the fulcrum. The lower end, which bears two silver contacts, is thus moved forward, and comes into contact with the corresponding vertical bar 11. When now the magnet 9 releases its armature, the bar 8 falls back and the lower part of the helical spring 10 is compressed by the peg 8a whilst the upper part is stretched. The peg 10a is clamped between the arm 6a and the carrier 3.

If the magnet 7 attracts without the magnet 9 having lifted the bar 8, the arm 6a will move the peg 10a under the carrier 3. When the bar 8 is afterwards lifted, the lower part of the helical spring 10 is being stretched.

In Fig. 4, also a multitude of frames 1 is placed on each other. In this case they are only kept together by the vertical bars 11, which run through the hole 12 in the bottom of the frame 1d.

The invention is of course not limited to the forms of construction given here. Thus, twice the number of vertical leads 11 and 12, respectively in Fig. 4 and half the number of horizontal leads 2 may be used and each tongue 2a either may be bent forward by the magnet 9a or backward by the magnet 9b. The groove 3b of the carrier 3 becomes then so small that no lost motion exists for the tongue 2a.

We claim:

1. A coordinate selector of the kind including a plurality of rows of parallel vertically and horizontally disposed contact members crossing each other and mounted in several horizontal and vertical parallel planes, comprising a plurality of separate horizontal frame structures each supporting at most two rows of horizontal contact members, each of said contact members being movable into and out of engagement with a crossing vertical contact member, the said vertical contact members being stationarily mounted on the frame structure, contact control means mounted horizontally slidable on each of said frame structures, one for each row of cross overs between the contact members, each of said control means coacting with the respective movable contact members for moving the latter into either one of the said two positions, a horizontal selecting bar mounted axially slidable on each frame structure, electromagnetic means each coacting with one of said bars for axially displacing the same in response to an energization of the respective electromagnetic means, a pair of vertical operating bars, one for each of the two rows in each horizontal plane, the said operating bars being mounted on the frame structure axially rotatable, electromagnetic means, one for each operating bar, coacting with the said bars for selectively rotating the same in either direction upon energization of the respective electromagnetic means, coupling and positioning means controlled by said selecting bars, one for each frame structure, displacement of a selecting bar by energization of the respective electromagnetic means effecting a movement transmitting coupling between the respective control means and a respective operating bar and a rotation of the said operating bar in either direction by energization of the respective electromagnetic means causing movement of the respective horizontal contact members into engagement with the corresponding crossing vertical contact members.

2. A selector according to claim 1, wherein the said coupling and positioning means comprise loaded spring means fixedly secured on one end to the respective frame structure and engaged by the respective selecting bar for varying the spring tension by a displacement of the said bar, the said spring means being formed with an extension lug engageable with the respective operating bar for effecting the said movement transmitting coupling.

3. A selector according to claim 2 and further comprising yieldable means mounted between each frame structure and opposite sides of the respective contact control means, one of said yieldable means being loaded upon displacement of the control means in one direction and the other upon displacement of the said means in the opposite direction for returning the control means into the respective initial position upon deenergization of the respective electromagnetic means.

4. A selector according to claim 1, wherein each of the said frame structures comprises a base plate with transverse holes therethrough for fixing the positions of the vertical contact members relative to the horizontal contact members and the contact control means.

5. In a co-ordinate selector according to claim 1, horizontal contact members each comprising a U-shaped elastic contact element perpendicularly protruding above the horizontal level of the cross-over points of the respective horizontal contact members, one of the branches of said element constituting a terminal lug and the other forming a flexible contact tongue, abutment means stationarily mounted on the respective frame structure and engageable with an intermediate portion of each tongue, the respective contact control means being disposed in a spacial relationship relative to the contact elements so that the said control means presses against the portion of the tongue above said abutment means upon a horizontal displacement of the control means for causing the lower portion of the tongue to move opposite to the direction of displacement of the control means, the said abutment means constituting the fulcrum of said tongue movement, the said lower tongue end being engageable with a respective vertical contact member.

6. A selector according to claim 5, wherein the branch of each contact element in one horizontal plane forming said terminal lug is metallically secured to a horizontal contact strip extending transversely to the direction of displacement of the respective contact control means.

References Cited in the file of this patent

UNITED STATES PATENTS

| Number | Name | Date |
|---|---|---|
| 2,341,029 | Field | Feb. 8, 1944 |
| 2,577,067 | Arthur | Dec. 4, 1951 |